(12) United States Patent
Welter et al.

(10) Patent No.: US 7,465,252 B2
(45) Date of Patent: Dec. 16, 2008

(54) HYDRAULIC ACTUATION SYSTEM

(76) Inventors: Roland Welter, Schlosshoehe 4, 77815 Buehl (DE); Matthias Zink, Hausaecker 3, 77883 Ottenhoefen (DE); Henry Hahn, Schulstr. 4, 77815 Buehl (DE); Udo Popp, Beethovenstr. 27, 77815 Buehl (DE); Markus Hausner, Bettina von Amim Weg 5, 76135 Karlsruhe (DE)

( * ) Notice: Subject to any disclaimer, the term of this patent is extended or adjusted under 35 U.S.C. 154(b) by 206 days.

(21) Appl. No.: 10/521,519

(22) PCT Filed: Jul. 17, 2003

(86) PCT No.: PCT/DE03/02390

§ 371 (c)(1),
(2), (4) Date: Oct. 14, 2005

(87) PCT Pub. No.: WO2004/010017

PCT Pub. Date: Jan. 29, 2004

(65) Prior Publication Data

US 2006/0100061 A1    May 11, 2006

(30) Foreign Application Priority Data

Jul. 18, 2002    (DE)    ................. 102 32 499

(51) Int. Cl.
*B60K 23/02*    (2006.01)
(52) U.S. Cl. ..................... 477/181; 192/85 R
(58) Field of Classification Search .................. 477/181; 192/85 R
See application file for complete search history.

(56) References Cited

U.S. PATENT DOCUMENTS

| 5,135,091 A |   | 8/1992 | Albers et al. .................. 192/85 |
| 5,301,781 A | * | 4/1994 | Tischer et al. ............. 192/85 R |
| 6,250,201 B1 |  | 6/2001 | Pagels et al. |
| 6,516,255 B2 | * | 2/2003 | Jager et al. ..................... 701/34 |
| 6,769,254 B2 | * | 8/2004 | Heller et al. .................. 60/589 |

FOREIGN PATENT DOCUMENTS

| DE | 37 36 584 |   | 5/1989 |
| DE | 41 21 016 A1 |  | 1/1992 |
| DE | 41 40 328 A1 |  | 6/1993 |
| DE | 4435258 A1 | * | 5/1995 |
| DE | 41 42 744 C2 |  | 5/1996 |
| DE | 198 12 254 A1 |  | 9/1999 |
| EP | 0 937 903 A2 |  | 8/1999 |
| EP | 0937 903 A3 |  | 8/1999 |
| FR | 2 283 380 |  | 3/1976 |
| JP | 58142035 |  | 8/1983 |

* cited by examiner

*Primary Examiner*—Sherry Estremsky
(74) *Attorney, Agent, or Firm*—Davidson, Davidson & Kappel, LLC

(57) ABSTRACT

A hydraulic actuation system, especially for actuating the clutch of a vehicle, containing a master cylinder unit, a slave cylinder unit, a hydraulic medium line connecting the two cylinder units and a throttle valve which is used to alter the flow resistance between the cylinders of the master cylinder unit and the slave cylinder unit.

8 Claims, 3 Drawing Sheets

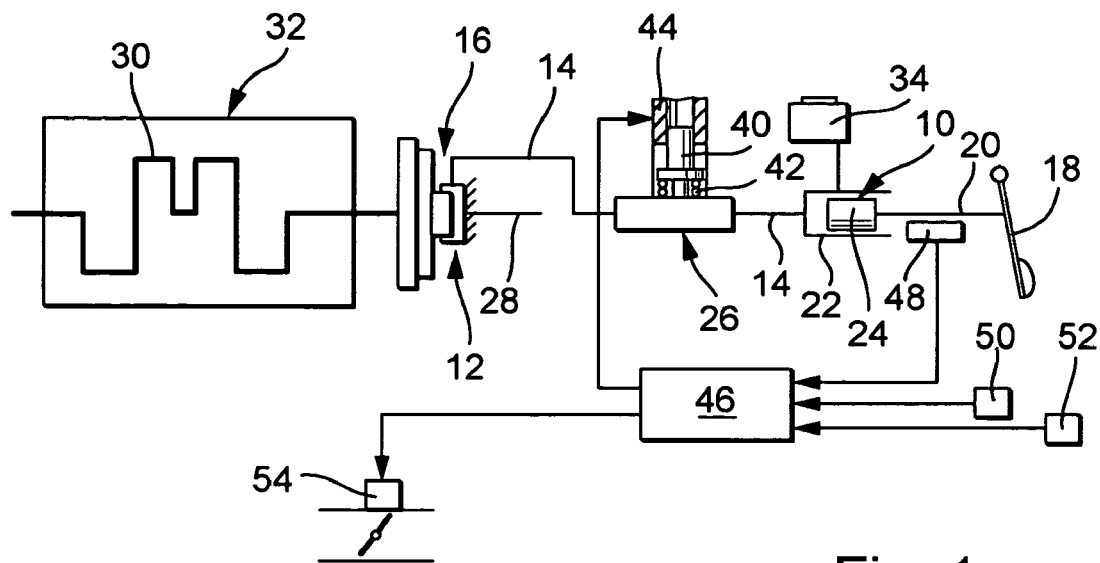
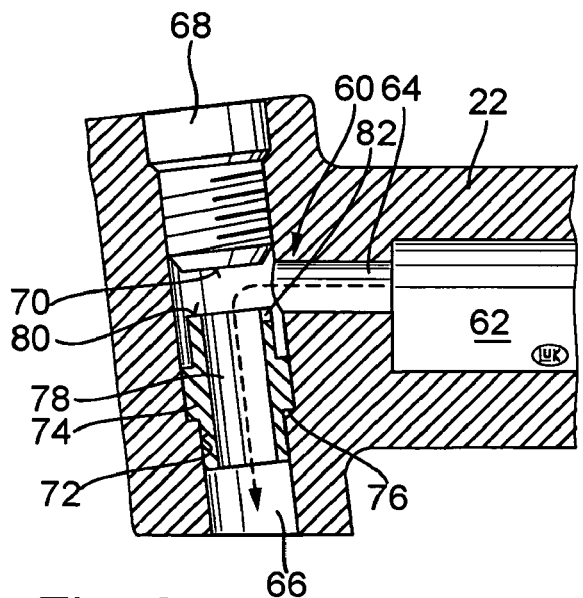
Fig. 2
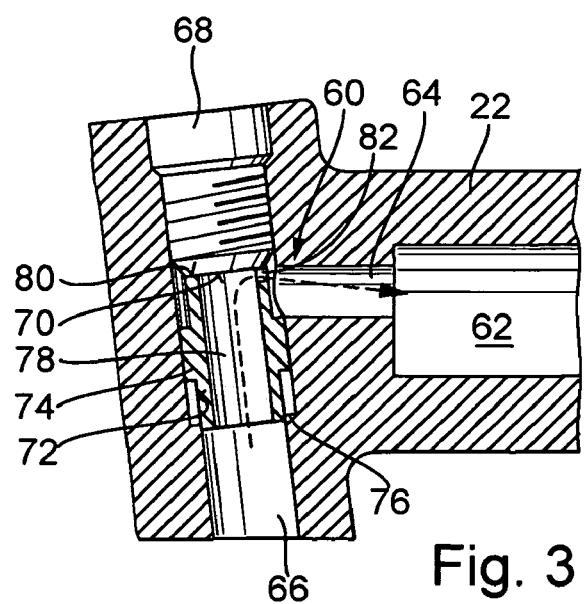
Fig. 3

HYDRAULIC ACTUATION SYSTEM

The present invention relates to a hydraulic clutch system, in particular for actuating a vehicle clutch. Furthermore, the present invention relates to a device for connecting a pipe-shaped hydraulic medium line to a connector on a housing, in particular in a hydraulic system according to the present invention.

BACKGROUND

Hydraulic actuation systems having a master cylinder unit, which is, for example, operated by a pedal using the foot, and which is connected via a pressure medium line to a slave cylinder unit, which actuates an assembly such as a vehicle clutch, transmission, or brake, have many applications. Actuation systems of this kind, in particular actuation systems for actuating a vehicle clutch, are designed to ensure that the assembly in question can be actuated safely and comfortably.

One problem encountered when vehicle clutches are actuated hydraulically is that the engine stalls if a clutch pedal is actuated too quickly to engage the clutch.

SUMMARY OF THE INVENTION

An object of the present invention is to provide a hydraulic actuation system, in particular for actuating a vehicle clutch, which allows actuation to be carried out in a carefully measured manner.

The present invention provides a hydraulic actuation system, in particular for actuating a vehicle clutch that includes a master cylinder unit, a slave cylinder unit, a pressure medium line connecting the two cylinder units, and a throttle valve for adjusting the flow resistance between the cylinders of the master cylinder unit and the slave cylinder unit. With the actuation system according to the present invention, the through-flow resistance between the cylinder units and thus the behavior of the hydraulic transfer section is adjustable based on the requirements in question by designing or controlling the throttle valve appropriately.

It is advantageous that the throttle valve is actuated by an actuator controlled by a control unit that is connected to a sensor which detects the engine speed and if necessary adjusts the through-flow cross section between the master cylinder unit and the slave cylinder unit during the starting-off procedure as a function of the engine speed curve. In this way, the through-flow cross section between the master cylinder unit and the slave cylinder unit may be adjusted as a function of the movement of the piston in question. The signals for controlling the device may of course also be generated using sensors already present in the vehicle, e.g., engine sensors, transmission input sensors, transmission output sensors and/or wheel speed sensors.

If the actuation system according to the present invention is used to actuate a vehicle starting clutch, it is advantageous that the sensor detects the engine speed and, if the engine speed curve exceeds predefined limiting values as the clutch engages, the control unit triggers the actuator in the direction of a reduction of the through-flow cross section. This means that the engine's required increase in torque as the clutch engages does not have to increase abruptly, and hence stalling of the engine is avoided.

It is advantageous that, if the engine speed curve exceeds predefined limiting values as the clutch engages, the control unit of the aforementioned actuation system triggers an actuator for adjusting the output of an internal combustion engine of the vehicle in the direction of an output increase. This further reduces the risk of stalling the engine, i.e., the internal combustion engine.

It is advantageous that the control unit is connected to further sensors for detecting the rotational speed of a vehicle wheel and/or a transmission ratio so that the through-flow cross section of the hydraulic section of the actuation system is adjustable optimally based on the prevailing operating conditions and in accordance with the requirements in question.

In a modified embodiment of an actuation system according to the present invention, a valve element of the throttle valve is movably mounted in a bore hole that extends roughly at right angles to a connector bore hole leading into the working chamber of one of the cylinder units and is designed and works in conjunction with walls of the bore hole in such a way that it is moved in one or another direction into contact with a stop edge by a hydraulic medium flow between the two cylinder units, and as a result a flow cross section made available by the valve element is reduced when it rests against the stop edge. With the aforementioned embodiment of the throttle valve, the axial space occupied by the corresponding cylinder unit is only minimally increased by the throttle valve, and furthermore the design is straightforward and very reliable.

It is advantageous that the valve as a whole is pipe-shaped, has an axial through-channel and is movably mounted so that hydraulic medium flowing out of the corresponding working chamber flows through the through-channel, and hydraulic medium flowing into the corresponding working chamber moves the valve element so that its end face rests against a wall that encloses the bore hole, so that the through-channel is at least partially closed and the hydraulic medium flows through a radial opening in the wall of the through-channel.

In a further refinement of the aforementioned throttle valve, the bore hole which bears the valve element is positioned in the housing of the corresponding cylinder unit and the pressure medium line is connected to the bore hole.

It is advantageous that the throttle valve is assigned to the master cylinder of a vehicle hydraulic clutch actuation system and reduces the flow cross section of a flow of hydraulic medium into the master cylinder.

A particularly straightforward design of a device for connecting a pipe-shaped hydraulic medium line to a connector on a housing, which in particular may be used in a hydraulic system of the type described above, includes an insertion channel in a cylindrical attachment part of the housing for insertion of a pipe, an annular space being formed between the outside of the pipe and the inside of the insertion channel, this being delimited axially inward by a radial annular surface, a locking element which is cylindrical as a whole and which is insertable into the insertion channel and which in its inserted state protrudes with its front end-section into the annular space and with its rear end-section lies outside the cylindrical attachment part, at least one sealing ring which may be positioned in the annular space between an end face of the locking element and the radial annular surface, and a locking sleeve which is rotatable relative to the locking element and is rotatable from an unlock position, in which the pipe is insertable through the locking sleeve and locking element beyond the annular surface of the attachment part and into the insertion channel, to a lock position in which the pipe is held axially against the attachment part by the locking element and/or locking sleeve.

The aforementioned device has a straightforward and cost-effective design and has the additional advantage that even when the pipe has not been installed, the sealing ring is held against the pre-assembled assembly that includes the housing and the locking element and, if applicable, the locking sleeve, and is thus protected against dirt and damage.

It is advantageous that the front end-section of the locking element in its inserted state extends back through the annular space of the cylindrical attachment part so that the locking element cannot be moved outward because it rests against the cylindrical attachment part in a form-locking manner.

It is advantageous that the annular space has in the outward direction a radial holding surface against which a counter-surface on the end-section of the locking element rests. This ensures that the locking element may be positioned against the attachment part without any problem.

If the rear end side of the locking element has radially inward a radial stop surface against which a projection on the pipe rests, the pipe may be positioned easily and reliably.

It is advantageous that the radial stop surface of the locking element delimits an annular space which overlaps the projection on the pipe. This ensures that the pipe cannot be shifted outward.

The projection is formed in a particularly straightforward manner by an annular bulge.

It is advantageous that the locking element has at least two fingers located diametrically opposite one another which rest against the outside of the cylindrical attachment part and work in conjunction with fingers on the locking sleeve so that in the locking sleeve's lock position they are pressed into engagement with the outside of the cylindrical attachment part in a form-locking manner.

BRIEF DESCRIPTION OF THE DRAWINGS

The present invention, which may generally be used for all kinds of hydraulic actuation systems, in particular those for actuating a vehicle clutch, is described in greater detail below by way of examples and with the help of schematic drawings.

FIG. 1 shows a schematic drawing of a hydraulic actuation system of a vehicle clutch;

FIGS. 2 and 3 show side views of a throttle valve with the valve element in two different positions;

DETAILED DESCRIPTION

Figure 4:
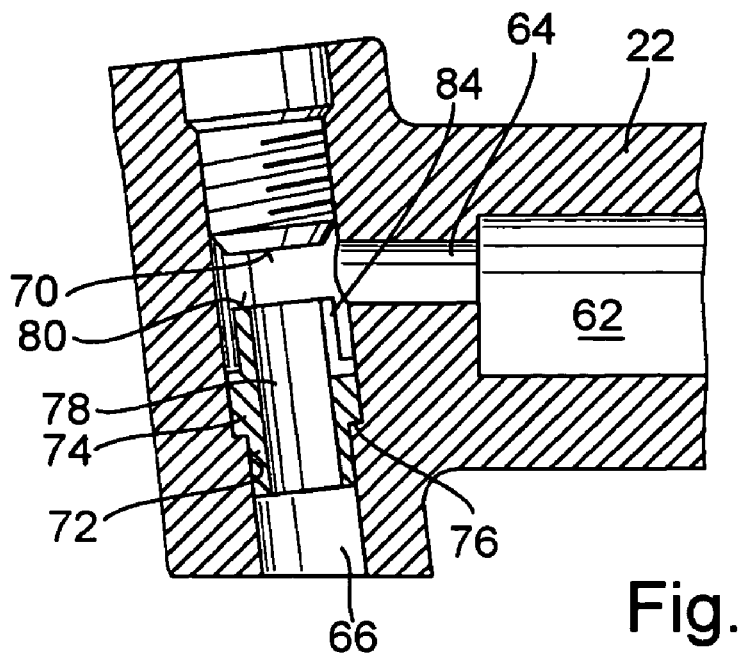
FIGS. 4 and 5 show side views of a further embodiment of a throttle valve with the valve element in two different positions.

As shown in FIG. 1, a hydraulic actuation system for a clutch includes a master cylinder unit 10, which is connected to a slave cylinder unit 12 via a hydraulic medium line 14. A clutch 16 is actuated hydraulically when master cylinder unit 10 is acted upon by an actuating element 18, which may be a foot pedal, an actuator, for example an electrical actuator or similar. When actuating element 18 is actuated, a movable piston 24 in cylinder 22 of master cylinder unit 10 is moved by a piston rod 20 to the left as shown in FIG. 1 so that pressure builds up in cylinder 22 and is conveyed via hydraulic medium line 14 through a throttle valve 26 into slave cylinder unit 12. It is advantageous that slave cylinder 12 is, as shown, positioned concentrically around a transmission input shaft 28 and rests axially on a transmission housing (not shown) so that the necessary release force may be exerted via a release bearing of clutch 16, i.e., on its release elements, e.g., disk springs, in a manner known heretofore.

When clutch 16, which is positioned concentrically with a crankshaft 30 of an internal combustion engine 32, is engaged, transmission input shaft 28 transfers the torque of internal combustion engine 32 to a transmission (not shown) and from that to the drive wheels of a vehicle.

A pressure medium reservoir 34 supplies pressure medium in a manner that is known heretofore, and is connected to master cylinder 10 when the latter is in the inoperative position, i.e., no pressure is being exerted on slave cylinder 12. In this position, pressure medium is able to flow back into master cylinder unit 10. When master cylinder unit 10 is actuated, pressure medium reservoir 34 is separated from master cylinder unit 10 by a valve (e.g., a covered snifter hole) which is not shown.

Throttle valve 26 includes a valve element 40 which is pushed into the open position by a spring 42 and which has a shaft that functions as an armature for an electromagnet 44. Electromagnet 44 is triggered by a control unit 46, the inputs of which are connected to a sensor 48 for detecting the speed of piston rod 20 and actuating element 18, a sensor 50 for detecting the rotational speed of a vehicle wheel (not shown), and a sensor 52 for detecting the gear, i.e., gear ratio, of a transmission (not shown). A further output of control unit 46 is connected to an actuator 54 for actuating a power control element of internal combustion engine 32, e.g., a throttle.

Electronically actuated throttle valve 26 functions as follows:

During the clutch's engaging procedure, the engine speed is detected. If the engine speed falls below an rpm limiting value which is dependent on the drop rate of the engine speed, current is applied to electromagnet 44 so that valve element 40 moves into a flow cross section formed by a housing of throttle valve 26 and reduces it.

The flow of hydraulic medium through line 14 is thus reduced so that clutch 16 engages more slowly, thus reducing the danger of stalling internal combustion engine 32.

Actuator 54 is optional. If it is present, it is advantageous that simultaneously with the increasing closure of throttle valve 26 the power control element is opened so that the engine speed is increased. This provides additional help in preventing stalling. The speed of opening of the power control element is, for example, proportional to the speed of closure, i.e., speed of engagement of the clutch.

Sensors 50 and 52 are also optional. If the wheel rotational speed and the gear position are detected, the throttle valve may be actuated in a manner appropriate to the operating situation, for example, the through-flow cross section of line 14 may be limited over a longer period if the vehicle is starting off in first gear than is the case when shifting between other gears, it also being possible for the degree of throttling, i.e., reduction of cross section, to also be dependent on the vehicle speed.

Various control strategies are feasible for the throttle valve, for example path control as a proportional valve, or pulses of the electromagnet having different frequencies, or 2-point control with open/closed only. Furthermore, various strategies are feasible for path measurement for master cylinder unit 10, for example, continuous path measurement, which may at the same time replace a currently customary brake light switch, and moreover the signals may be used in conjunction with an engine control system for improving driving comfort. In a straightforward form, 2- or 3-point measurement is sufficient, as found currently with pedal switches or at the master cylinder unit.

Active throttle valve 26 as described, which may be designed and actuated in a variety of ways (globe valve, turning valve etc.), is advantageous when starting off, i.e., for preventing stalling of the engine, and furthermore may also advantageously be used when shifting between higher gears.

A further advantageous application of the active throttle valve is that it may be used to suppress back-engagement between the engine and the clutch pedal, e.g., as caused by engine vibration. Excessively high pressure in hydraulic medium line 14, which in FIG. 1 is shown to the left of throttle valve 26, as may be induced by vibration, may be detected by a pressure sensor.(not shown) and converted into a throttling of the through-flow cross section.

FIGS. 2 and 3 show cross sections through a passive throttle valve 60, the valve element of which is in two different positions. An axial cross section through a part of master cylinder 22 is shown. From working chamber 62 of a master cylinder 22, connector bore hole. 64 leads into a further bore hole 66 which is roughly at right angles to connector bore hole 64 in the housing of cylinder 22 and which, as shown in FIG. 2, is closed off from above by a stopper 68 so that a fluid-tight seal is ensured. Stopper 68, which may be, for example, screwed into bore hole 66, has an end face 70 which is roughly flush with the upper side of connector bore hole 64. A pipe- or sleeve-shaped valve element 72 is movable in bore hole 66 via a collar 74.

FIG. 2 shows the fully opened position of throttle valve 60 assumed by valve element 72 when hydraulic medium flows from working chamber 62 into bore hole 66, to which as shown in FIG. 2 hydraulic medium line 14 (FIG. 1) is connected at the lower end. In the fully open position, collar 74 rests against a step 76 of bore hole 66 so that the opening movement of valve element 72 is limited. Of course valve element 72 is ribbed on its outside beneath collar 74 and/or bore hole 66 is ribbed below step 76 so that hydraulic medium between the collar and the step is able to escape. As can be seen, when valve element 72 is in the open position the entire cross section of a through-channel 78 through valve element 72 is available.

When the flow direction of medium is reversed, i.e., it flows out of bore hole 66 into working chamber 62, valve element 72 moves out of the position shown in FIG. 2 into the position shown in FIG. 3 in which its upper annular end face 80 rests against end face 70 of stopper 68. In this case there is only a small flow cross section available for the medium to flow through through-channel 78, this being formed by one or a plurality of recesses 82 on the upper edge of valve element 72. Of course recess or recesses 82 do not have to be located directly on the upper edge of valve element 72, but rather may be in the form of one or a plurality of radial bore holes above collar 74.

The functioning of throttle valve 60 as shown in FIGS. 2 and 3 is as a whole similar to that of throttle valve 26 shown in FIG. 1, with the difference that throttle valve 60 functions passively. When medium flows rapidly into working chamber 62, for example when the clutch is engaged, valve element 72 moves into its upper resting position and reduces the through-flow cross section to a minimum defined by recess 82. In this way, the dynamic torque that the engine has to provide, in particular when the vehicle starts off with the clutch pedal having been released very rapidly, is limited.

Of course various embodiments of valve element 72, which is moved by the pressure medium flow, i.e., by the pressure of the pressure medium, and of throttle valve 60 are feasible. For example, valve element 72 may have a plurality of axial through-flow channels which in the position shown in FIG. 2 are all open and at least a few of which are closed in the position shown in FIG. 3. In addition, a spring may be provided to pre-tension the valve element in one of its end positions.

The design of throttle valve 60 which is integrated into the housing of cylinder 22 is extremely compact and straightforward and only minimally lengthens cylinder 22 in its axial direction by the diameter of bore hole 66.

Figure 5:
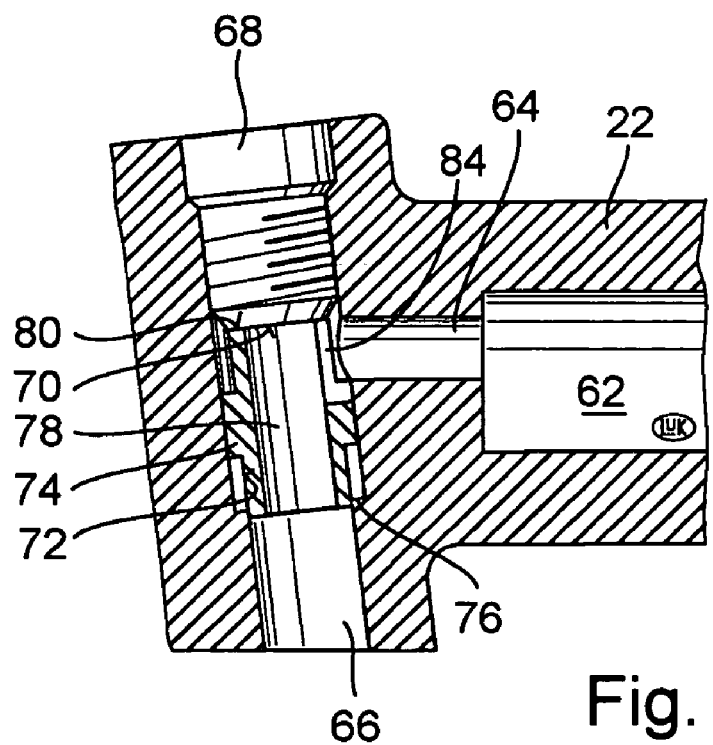

FIGS. 4 and 5, which largely correspond to FIGS. 2 and 3, show a modified embodiment of a valve element. Collar 74 of valve element 72 is axially longer than in the embodiment shown in FIGS. 2 and 3 and includes, near its upper edge, one or a plurality of radial holes 84. In the closed position of valve element 72 shown in FIG. 4, radial holes 84 are covered by the wall of bore hole 66, and the entirety of through-channel 78 of valve element 72 is available for through-flow, whereas in the closed position shown in FIG. 5, hole or holes 84 are open to connector bore hole 64 and through-channel 78 is closed off in the upward direction because end faces 70 and 80 are resting against one another.

Hydraulic actuation systems of the type described are produced in large volumes and it is important that there be an inexpensive and functionally reliable connection between hydraulic medium line 14 and cylinder units 10 and 12.

Figure 6:
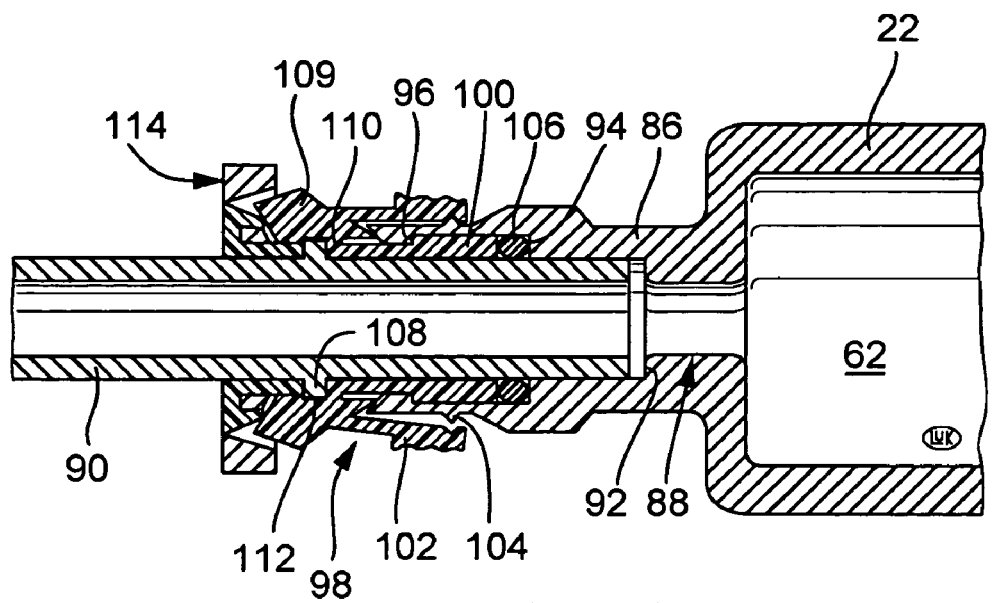
FIG. 6 shows an axial section through a connector device.
Figure 7:
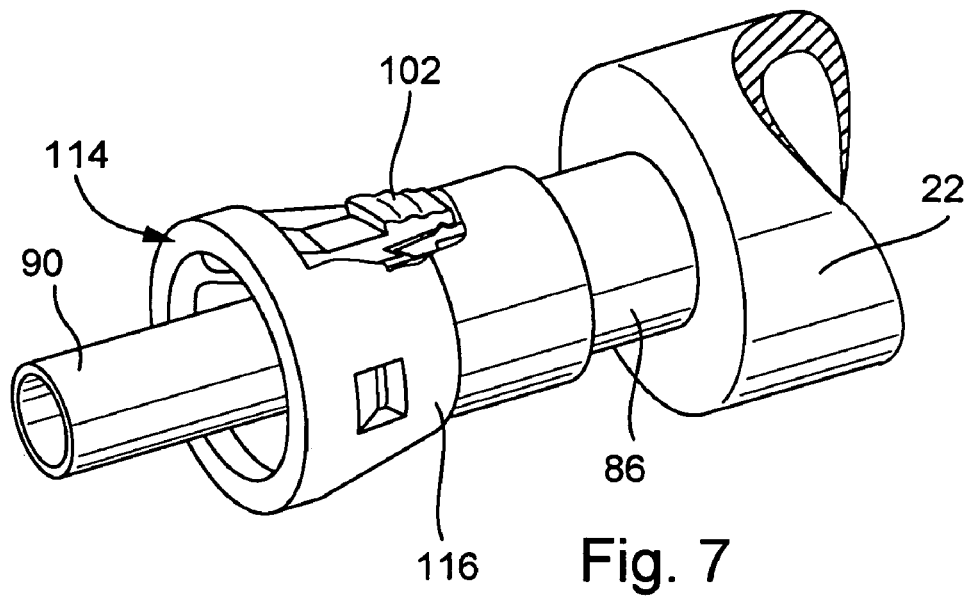
FIG. 7 shows a perspective view of the device shown in FIG. 6.

FIGS. 6 and 7 show an axial section through and a perspective view of a connector of this kind.

Cylinder 22, i.e., its housing, ends in a cylindrical attachment part 86, in which an insertion channel 88 for the insertion of hydraulic medium line 14 (FIG. 1) which ends as pipe 90, is provided. The insertion channel, which is connected to working chamber 62 of cylinder 22, enlarges its diameter at a first step 92 and then again at a second step 94 which is axially at a distance therefrom, and then ends after a third step 96 at which the diameter is reduced. The section between first step 92 and second step 94 has an inner diameter which roughly matches the outer diameter of pipe 90. As shown in FIGS. 6 and 7, locking element 98, which is as a whole cylindrical, is inserted from the left into insertion channel 88, has an inner diameter which matches the outer diameter of the pipe, protrudes with front end-section 100 into an annular space between second step 94 and third step 96, and extends back against third step 96. Locking element 98, which is made of, for example, plastic, has on its outside fingers 102, which are positioned at a distance from one another around the circumference, for example offset by 180° from one another, may be pushed onto the slightly conical outer surface of attachment part 86 subject to elastic expansion, and extend back against annular rib 104 of attachment part 86 in a form-locking manner. Before locking element 98 is pushed onto attachment part 86, at least one sealing ring 106 is placed in the annular space between steps 94 and 96.

The inward movement of locking element 98 relative to attachment part 86 (to the right as shown in the figures) is limited because the front end of attachment part 86 rests against locking element 98 within fingers 102, which ensures that sealing ring 106 is not forcibly misshapen when locking element 98 is inserted.

At its left-hand end-section 109, as shown in the figures, the locking element has an annular space 108 formed by the stepped design, which at the right-hand side as shown in the figures forms a stop surface 110 for a projection 112 on pipe 90. At its left-hand end, annular space 108 surrounds projection 112 in a form-locking manner. From the left, a locking sleeve 114 is placed onto locking element 98 and has fingers 116 which, when locking sleeve 114 is in the appropriate rotated position, overlap fingers 102 of locking element 98 and hold them against the outer surface of attachment part 86. Locking sleeve 114 functions as a bayonet in conjunction with locking element 98 via corresponding diagonal surfaces.

The described system is assembled as follows:

Sealing element 106 is inserted into insertion channel 88. Next, locking element 98 is inserted, and locking sleeve 114 is pushed onto locking element 98, its being feasible to push it on in a rotated position, locking between locking sleeve 114 and locking element 98 then occurring after locking sleeve 114 has been rotated by 90°. Thus the assembly of sealing element 106, locking element 98, and locking sleeve 114 may be pre-mounted on cylinder 22. To create a connection with the hydraulic medium line, pipe 90 is inserted from the left through locking sleeve 114 and locking element 98 into insertion channel 88 until projection 112, which forms a single component along with pipe 90, comes to rest against stop surface 110 after end-section 109 of locking element 98 has been gently elastically expanded. The end face of pipe 90, which is shown on the right in the figures, is then at a distance from step 92, and sealing element 106 creates a reliable seal between pipe 90 and attachment part 86. Next, locking sleeve 114 is rotated so that it presses end-section 109 of locking element 98 so that there is form-locking contact with projection 112 and so that its fingers 116 press fingers 102 so that they rest in a form-locking manner against the outer surfaces of attachment part 86. In this way, pipe 90 is attached reliably to attachment part 86 so that there is a seal.

Of course the described system may be modified in many ways. For example, projection 112 of pipe 90 is not needed if pipe 90 is only to be held in place by friction. Nevertheless, with the described undercuts a particularly reliable positive lock between the individual components, which hold pipe 90 axially in place on cylinder 22, may be achieved.

Figure 8:
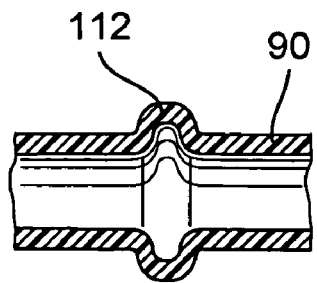
FIG. 8 shows a longitudinal section through a pipe having a projection formed by a bulge.

FIG. 8 shows a particularly straightforward embodiment of projection 112 of pipe 90. As shown in FIG. 8, projection 112 may be created in a straightforward manner by compressing pipe 90 axially so that a radial bulge is created. This means inexpensive pipe produced by the meter may be used for the hydraulic medium line, i.e., pipe 90.

The patent claims filed with the application are formulation proposals without prejudice of the achievement of broader patent protection. The applicant reserves the right to claim additional feature combinations previously only disclosed in the description and/or the drawing. The back-references used in the dependent claims indicate further refinements of the object of the independent claim by the features of the particular dependent claim. They are not to be understood as a waiver of obtaining independent objective protection for the combinations of features of the back-referenced dependent claims. Because the objects of the dependent claims may form separate independent inventions with respect to the related art on the priority date, the applicant reserves the right to make them the object of independent claims or division clarifications. They may furthermore also contain independent inventions having a design that is independent of the objects of the aforementioned dependent claims.

The exemplary embodiments are not to be understood as limitations of the present invention. Rather, numerous modifications and variants are possible within the present disclosure, in particular variants, elements, and combinations and/or materials that are obvious to those skilled in the art regarding the achievement of the object or the achievement of advantages, for example, by combination or modification of individual features or elements or method steps described in conjunction with those in the general description and embodiments as well as in the claims and contained in the drawing, resulting in a new object or new method steps or method step sequences via combinable features, including those concerning manufacturing, testing, and work methods.

What is claimed is:

1. A hydraulic actuation system, comprising:
   a master cylinder unit;
   a slave cylinder unit;
   a hydraulic medium line connecting the master cylinder unit and the slave cylinder unit;
   a throttle valve for adjusting a flow resistance between cylinders of the master cylinder unit and the slave cylinder unit;
   a throttle valve actuator configured to actuate the throttle valve;
   a piston sensor configured to detect a movement of a piston in at least one of the cylinder units; and
   a control unit connected to the piston sensor and controlling the throttle valve actuator.

2. The actuation system as recited in claim 1, wherein the actuation system is configured to actuate a vehicle clutch, wherein the piston sensor detects movement speed of the piston of the master cylinder unit, and, if the speed exceeds a predefined value as the clutch engages, the control unit triggers the actuator to reduce a through-flow cross section of the hydraulic medium line.

3. The actuation system as recited in claim 2 further comprising an engine actuator configured to increase an output of an internal combustion engine of the vehicle if the piston reaches a predefined position and/or the piston speed exceeds a predefined value as the clutch engages.

4. The actuation system as recited in claim 2, wherein the control unit is connected to at least one of a wheel sensor configured to detect a rotational speed of a vehicle wheel and a transmission ratio sensor.

5. The actuation system as recited in claim 1, wherein the throttle valve includes a connector bore hole leading to a working chamber of one of the cylinder units, a bore hole extending at a substantially right angle to the connector bore hole, and a valve element disposed in the bore hole and moveable by a flow of the hydraulic medium between the cylinder units to a stop position in contact with the stop, in which a flow cross section of the throttle valve is reduced.

6. The actuation system as recited in claim 5, wherein the valve element is pipe-shaped and includes an axial through-channel having a channel wall and a radial opening in the channel wall, the valve element being moveable from a first position, in which hydraulic medium flowing out of the working chamber flows through the through-channel, to the stop position by the hydraulic medium flowing into the working chamber, in which an end face of the valve element rests against the stop at least partially closing the through-channel, and the hydraulic medium flows through the radial opening.

7. The actuation system as recited in claim 5, wherein the bore hole is disposed in a housing of the respective cylinder unit and the pressure medium line is connected to the bore hole.

8. The actuation system as recited in claim 5, wherein the throttle valve is assigned to the master cylinder unit of a vehicle hydraulic clutch actuation system and reduces the flow cross section of the flow of hydraulic medium into the master cylinder.

* * * * *